H. HARRIS.
Nut-Lock.

No. 206,441.      Patented July 30, 1878.

ATTEST.
Paul Bakewell
Saml. S. Boyd

INVENTOR.
Henry Harris
by Chas. D. Moody
atty.

UNITED STATES PATENT OFFICE.

HENRY HARRIS, OF KNOBNOSTER, MISSOURI.

IMPROVEMENT IN NUT-LOCKS.

Specification forming part of Letters Patent No. 206,441, dated July 30, 1878; application filed March 30, 1878.

*To all whom it may concern:*

Be it known that I, HENRY HARRIS, of Knobnoster, Missouri, have made a new and useful Improvement in Nut-Locks, of which the following is a full, clear, and exact description, reference being had to the annexed drawing, making part of this specification, in which—

Figure 1:
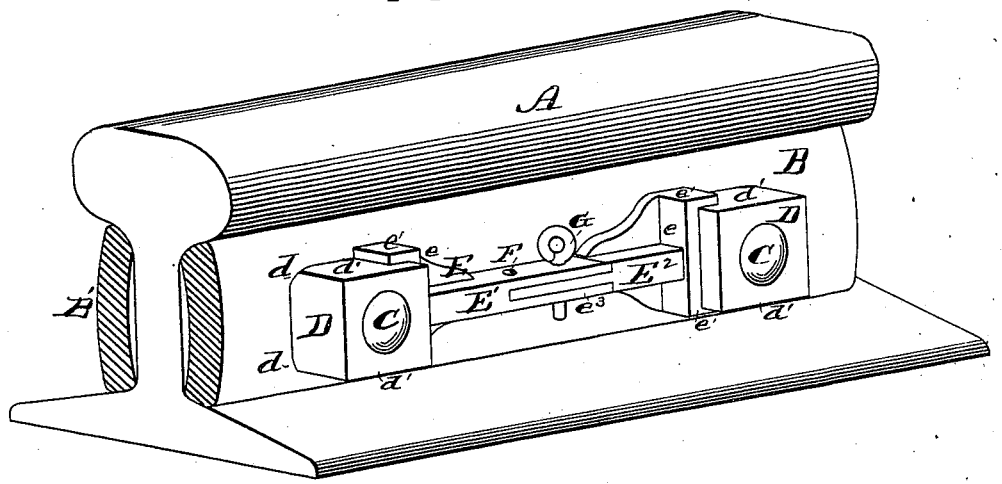
Figure 2:
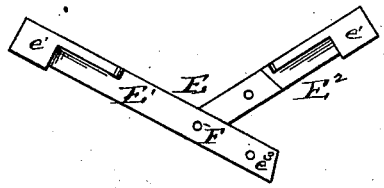
Figure 3:
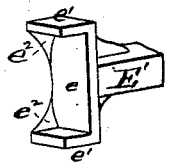

Figure 1 is a view, in perspective, of a rail and fish-bars, and showing the invention in position; Fig. 2, a plan of the locking-plate, its parts being turned upon each other as in attaching and detaching the plate; and Fig. 3, a detail, being a view, in perspective, of one of the ends of the locking-plate.

The same letters of reference represent the same parts.

The present construction is an improvement in that class of nut-locks wherein the locking is effected by means of a plate arranged between two adjacent nuts, and bearing at its ends against the nuts.

It has especial relation to the means whereby the plate is held in place, and to the provision for enabling the plate to be readily attached and detached.

The improvement is more especially adapted to a railway fish-bar splice, in connection with which it is shown.

Referring to the drawing, A represents a rail, B B' fish-bars, C C bolts, and D D nuts, constructed and arranged in the usual manner, the nuts being rounded on the under side, at the corners $d\,d$, as shown in Fig. 1.

E represents the improved plate. It is arranged between the nuts D D, and bears, at its ends $e\,e$, against them, thereby preventing the nuts from turning. The plate is also preferably extended at $e^1\,e^1$, to enable it to have a bearing on the top and bottom sides, $d^1\,d^1$, of the nuts. The principal feature, however, of the plate is the extensions $e^2\,e^2$, which extend respectively beyond the parts $e\,e$, and so as to come, when the plate is in position, beneath the nuts at $d\,d$, and thereby secure the plate between the nuts.

As the plate, including the extensions $e^2\,e^2$, is longer than the space between the nuts, to enable it to be placed in position after the nuts are screwed down onto the fish-bar, it is made in two parts, $E^1\,E^2$, that are jointed together at F, enabling the two parts to be turned upon each other, as in Fig. 2.

The plate, in this shape, is placed between the nuts, and then pressed down upon the fish-bar, bringing the extensions $e^2\,e^2$ beneath the nuts. The part $E^1$ is made to extend beyond the joint F, and when the plate is pressed down, as above described, the extension $e^3$ laps upon the part $E^2$.

A pin, G, is then passed through the parts $e^3\,E^2$. This prevents the parts $E^1\,E^2$ from turning upon each other, and thus as long as the pin G remains in place the plate E remains rigid throughout its length, and cannot be displaced from its position between the nuts. It can, however, be readily detached by first removing the pin G, and then drawing the plate into the shape shown in Fig. 2. The pin G can be fastened in place by bending its lower end upward against the plate.

In place of the hinge-joint F, the two parts $E^1\,E^2$ of the plate may be made to be entirely detached from each other, and in place of the rivet at F another removable pin, similar to the pin G, might be used; but I prefer the arrangement shown.

The extensions $e^2\,e^2$ may be of any desirable shape to fit the spaces left between the nuts and the fish-bar, and the nuts may, on the side toward the fish-bar, be cut away, as desired.

I claim—

1. The jointed plate E, having the extensions $e^2\,e^2$ and $e^3$, the pin G, and the nuts D D, rounded at $d\,d$, substantially as described.

2. The jointed plate E, having the extensions $e^1\,e^1\,e^2\,e^2\,e^3$, the pin G, and the nuts D D, rounded at $d\,d$, combined and operating substantially as described.

HENRY HARRIS.

Witnesses:
E. J. HINES,
C. COBB.